(12) United States Patent
Ogata

(10) Patent No.: US 9,385,894 B2
(45) Date of Patent: Jul. 5, 2016

(54) RECEIVING CIRCUIT AND DATA DECISION METHOD

(71) Applicant: FUJITSU LIMITED, Kawasaki-shi, Kanagawa (JP)

(72) Inventor: Yuuki Ogata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/823,254

(22) Filed: Aug. 11, 2015

(65) Prior Publication Data

US 2016/0099819 A1    Apr. 7, 2016

(30) Foreign Application Priority Data

Oct. 2, 2014   (JP) ................. 2014-204284

(51) Int. Cl.
  *H03H 7/30*       (2006.01)
  *H04L 25/03*      (2006.01)
  *H04L 7/04*       (2006.01)
  *H04B 1/16*       (2006.01)

(52) U.S. Cl.
  CPC ............ *H04L 25/03057* (2013.01); *H04B 1/16* (2013.01); *H04L 7/04* (2013.01)

(58) Field of Classification Search
  CPC .............. H04L 25/03057; H04L 2025/0349; H04L 2025/03617; H04L 2025/03503; H04L 25/03038; H04L 2025/03477; H04L 25/03019; H03H 21/0012; G11B 20/10
  USPC .................................. 375/233, 232, 230, 229
  See application file for complete search history.

(56) References Cited

U.S. PATENT DOCUMENTS

| 6,178,213 | B1 | 1/2001 | McCormack et al. |
| 8,791,735 | B1* | 7/2014 | Shibasaki ............. H03L 7/0812 327/147 |
| 2010/0008413 | A1 | 1/2010 | Yamazaki et al. |
| 2010/0303143 | A1 | 12/2010 | Takeda |
| 2013/0169328 | A1* | 7/2013 | Shibasaki ............. H03L 7/0814 327/156 |

FOREIGN PATENT DOCUMENTS

| JP | 2002-523971 | 7/2002 |
| JP | 2010-278720 | 12/2010 |
| WO | 2008/117441 | 10/2008 |

* cited by examiner

*Primary Examiner* — Zewdu Kassa
(74) *Attorney, Agent, or Firm* — Fujitsu Patent Center

(57) ABSTRACT

A receiving circuit includes: a first decision circuit to output boundary data obtained by performing a binary-decision on input data in synchronization with a first clock; a first decision feedback equalizer to output center data obtained by performing equalization and a binary-decision on the input data using a first equalization coefficient in synchronization with a second clock; a phase detection circuit to detect phase information of the input data based on the boundary data and the center data; a phase control circuit to output phase difference information of the center data based on an opening of an eye pattern formed by overlaying data transition patterns; a first phase adjustment circuit to adjust a phase of the first clock based on the phase information; and a second phase adjustment circuit to adjust a phase of the second clock based on the phase information and the phase difference information.

20 Claims, 16 Drawing Sheets

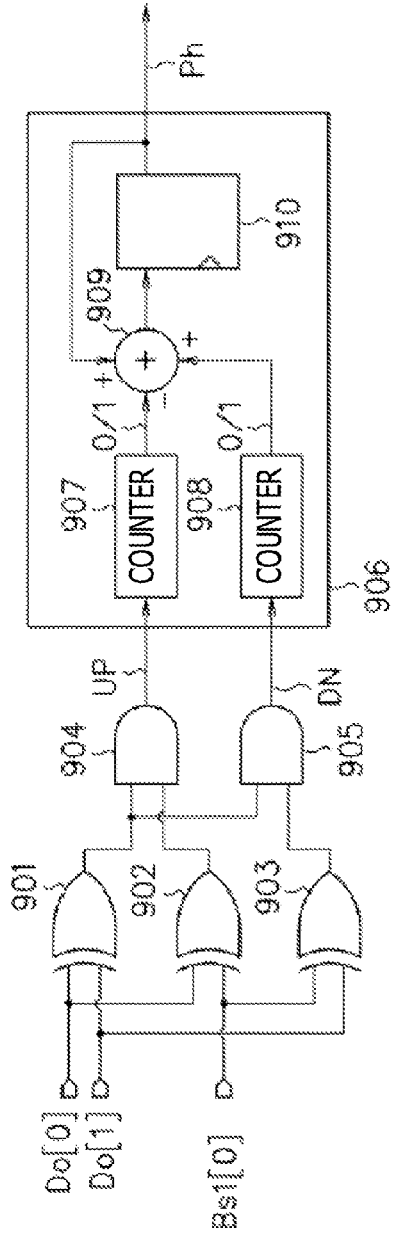
FIG. 5A
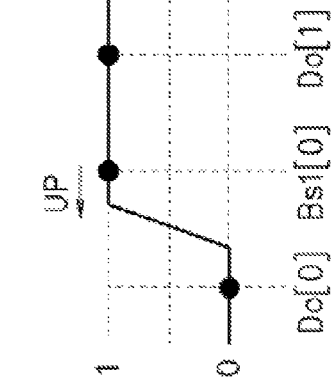
FIG. 5D
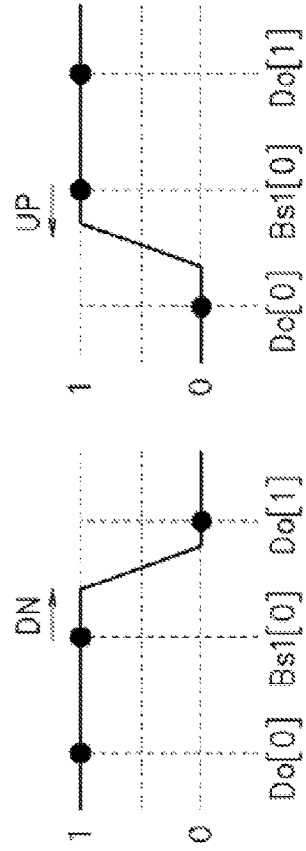
FIG. 5C
FIG. 5B

TIME (UI)

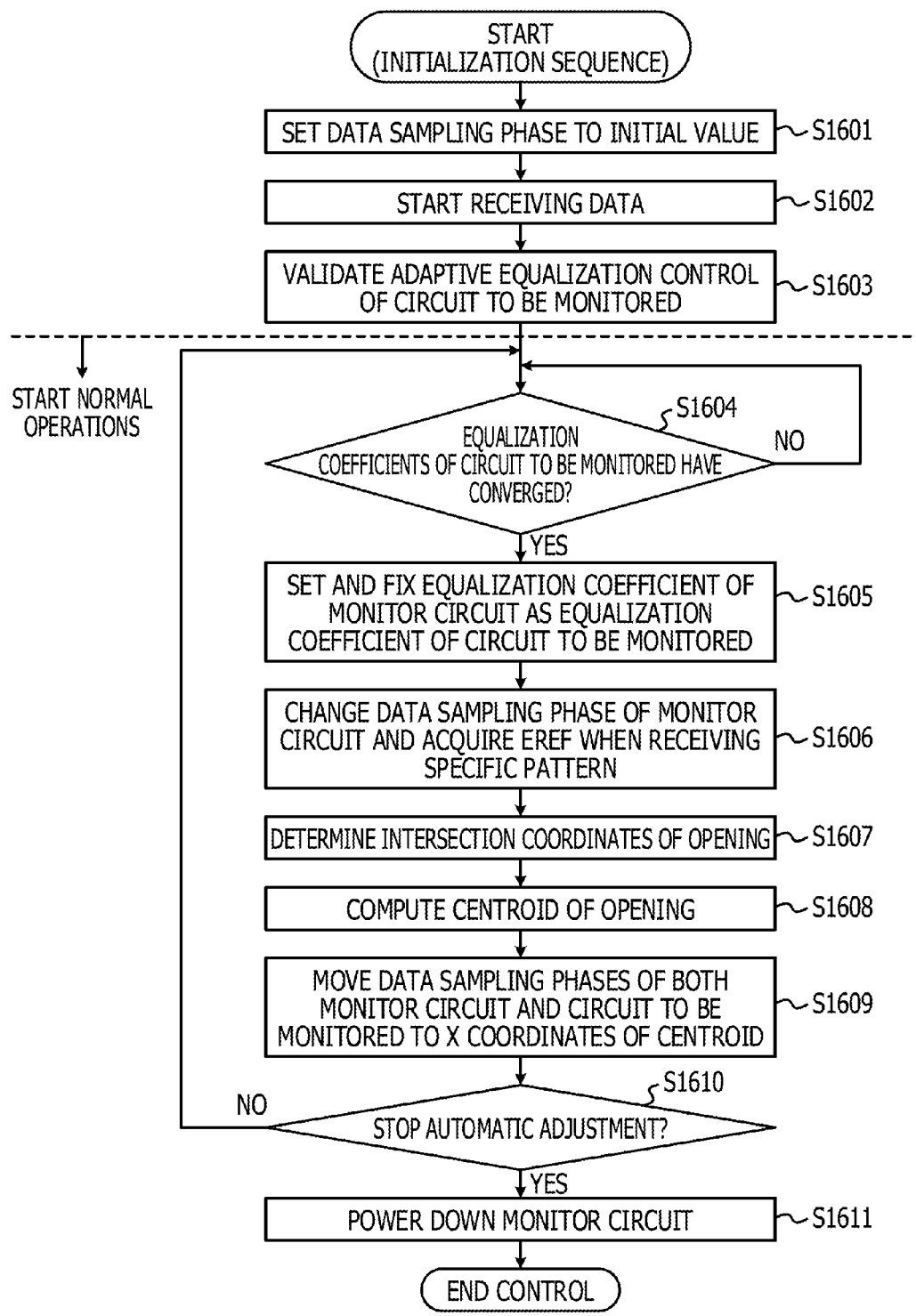

RECEIVING CIRCUIT AND DATA DECISION METHOD

CROSS-REFERENCE TO RELATED APPLICATION

This application is based upon and claims the benefit of priority of the prior Japanese Patent Application No. 2014-204284, filed on Oct. 2, 2014, the entire contents of which are incorporated herein by reference.

FIELD

The embodiments discussed herein are related to a receiving circuit and a data decision method.

BACKGROUND

In receiving circuits, incoming signals are received and a decision is performed on the incoming signals.

Related techniques are disclosed in International Publication Pamphlet No. WO 2008/117441, Japanese National Publication of International Patent Application No. 2002-523971, and Japanese Laid-open Patent Publication No. 2010-278720.

SUMMARY

According to one aspect of the embodiments, a receiving circuit includes: a first decision circuit configured to output, as boundary data, data obtained by performing a binary decision on an input data signal in synchronization with a first clock signal; a first decision feedback equalizer configured to output, as center data, data obtained by performing equalization and a binary decision on the input data signal using a first equalization coefficient in synchronization with a second clock signal; a phase detection circuit configured to detect phase information of the input data signal based on the boundary data and the center data; a phase control circuit configured to output phase difference information of the center data based on an opening of an eye pattern that is formed by overlaying a plurality of data transition patterns of the input data signal on a time base; a first phase adjustment circuit configured to adjust a phase of the first clock signal in accordance with the phase information; and a second phase adjustment circuit configured to adjust a phase of the second clock signal in accordance with the phase information and the phase difference information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A illustrates an example of a phase detection circuit;
FIG. 5B to FIG. 5D depict an example of data of a phase detection circuit;
FIG. 16 illustrates an example of a method for controlling a receiving circuit.

DESCRIPTION OF EMBODIMENTS

An equalizer characteristics optimizing method includes a recovery clock acquisition stage of acquiring a recovery clock timing from a received signal whose frequency characteristics are compensated by an equalizer, and a sampling clock acquisition stage of acquiring a certain sampling clock timing with respect to the recovery clock timing. In a first latch stage, the received signal whose frequency characteristics are compensated by the equalizer is latched at the recovery clock timing. In a second latch stage, the received signal whose frequency characteristics are compensated by the equalizer is latched at the sampling clock timing. In a logic-value comparison stage, a logic value obtained in the first latch stage is compared with a logic value obtained in the second latch stage. In a data collection stage, logic value comparison result data is collected by repeating processing in the recovery clock acquisition stage, in the sampling clock acquisition stage, in the first latch stage, in the second latch stage, and in the logic value comparison stage on the received signal having frequency characteristics compensated by the equalizer whose characteristics setting have been changed. In an optimization setting extraction stage, optimum characteristics setting of the equalizer is determined based on data of the logic value comparison result which is collected in the data collection stage.

A data recovery system includes a unit that receives a data signal, and a unit that splits the data signal into a data channel signal and a monitor channel signal. The data recovery system includes a unit that digitizes the data channel signal to obtain a data out signal, and a unit that digitizes the monitor channel signal to obtain a monitor out signal. The data recovery system includes a comparison unit that compares the data out signal with the monitor out signal, and a unit that, in response to a signal generated by the comparison unit, adjusts the unit that digitizes the data channel signal.

A signal processing apparatus includes an equalizer that amplifies a certain frequency band of an input signal, and a sampler that samples the output signal amplified by the equalizer with the output signal being offset in an amplitude direction using a multiphase clock system. An area information calculation unit calculates area information of an eye opening in an eye diagram of the output signal based on the output signal sampled by the sampler. A control unit controls amplification of the equalizer based on the area information of the eye opening calculated by the area information calculation unit.

A decision feedback equalizer equalizes a received signal in order to remove characteristics of a transmission path. In the decision feedback equalizer, a phase shift occurs in accordance with the amount of equalization. The phase shift may shift the phase of data to be determined from the optimum phase, thereby increasing the decision error rate.

Figure 1:
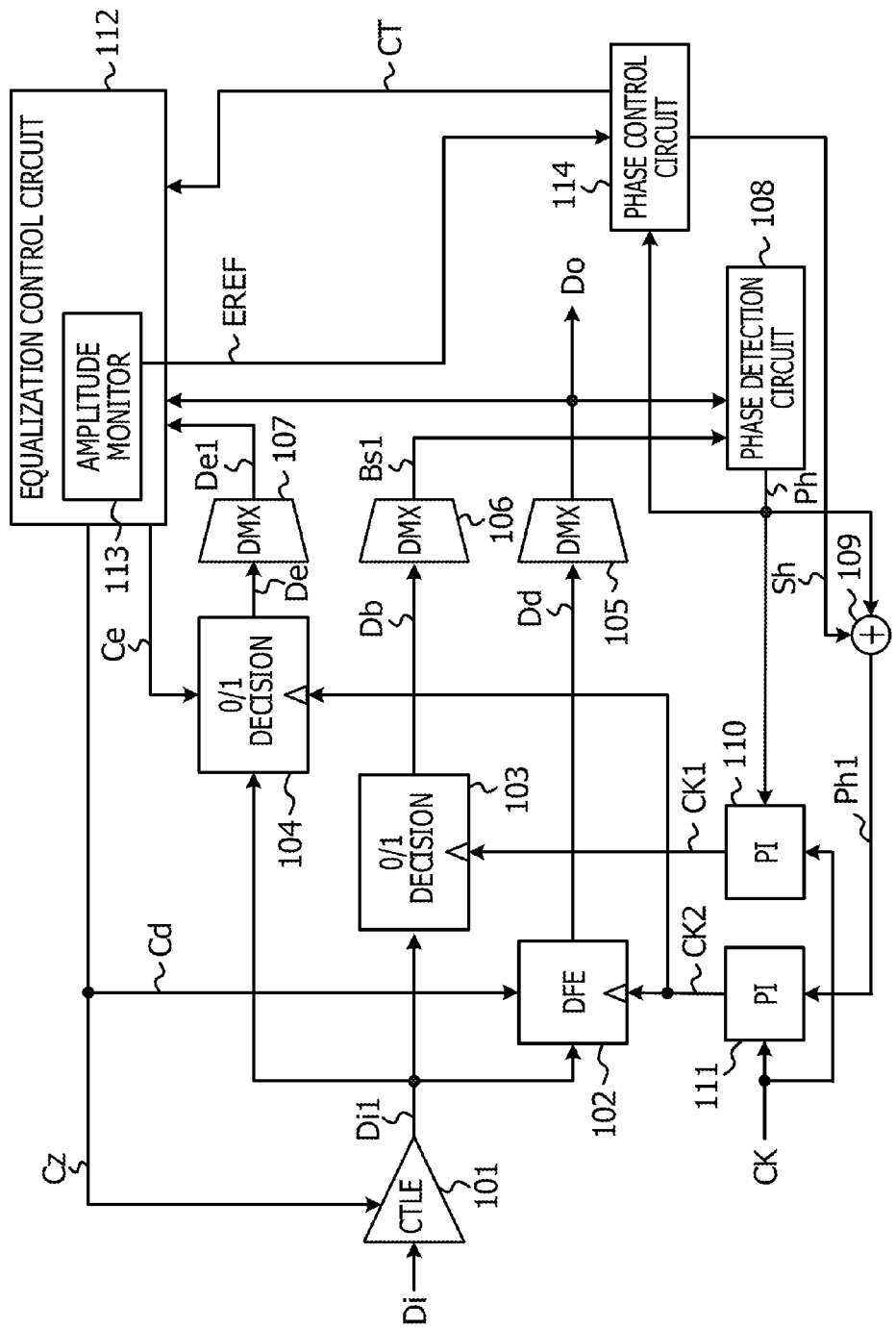
FIG. 1 illustrates an example of a receiving circuit.

FIG. 1 illustrates an example of a receiving circuit. The receiving circuit may be, for example, a receiving circuit of a high-speed input/output (I/O) circuit that transmits and receives signals with high bit rates within an integrated circuit chip or between chips (intra-device or inner-device). Based on an input data signal Di with a high data rate, the receiving circuit restores a clock signal and data (clock and data recovery: CDR).

The input data signal Di is input from a transmission circuit via a transmission path to the receiving circuit. Once the transmission circuit transmits a binary pulse signal, the receiving circuit receives the input data signal Di having a high-frequency component attenuated by the characteristics of the transmission path. An equalizer 101 equalizes the input data signal Di in order to remove the characteristics of the transmission path and outputs an input data signal Di1 that is close to a transmission pulse signal of the transmission circuit. The equalizer 101 equalizes the input data signal Di using an equalization coefficient Cz and outputs the equalized input data signal Di1. The input data signal Di1 is a signal whose high frequency component is emphasized with respect to the input data signal Di.

Figure 2:
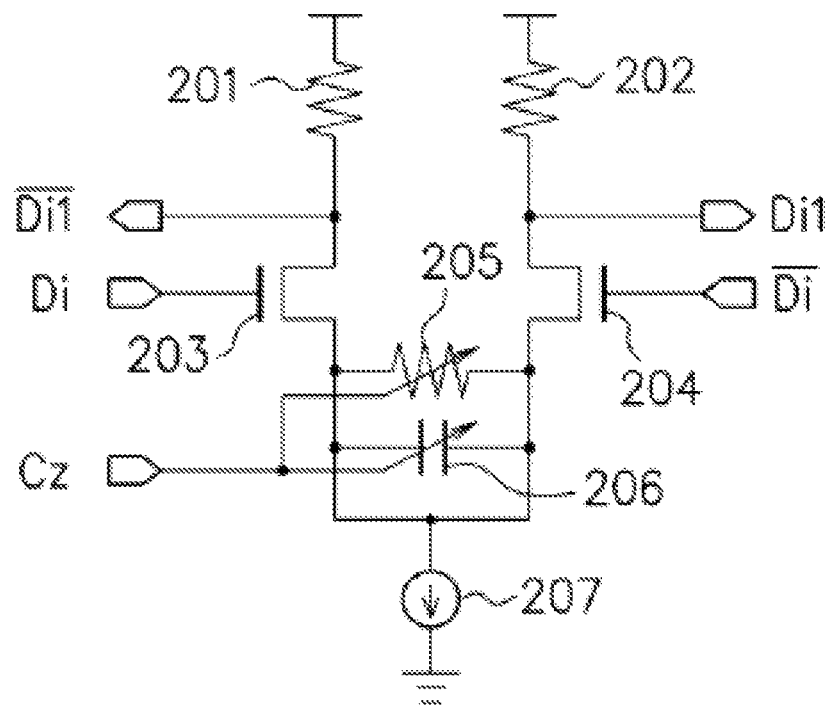
FIG. 2 illustrates an example of an equalizer.

FIG. 2 illustrates an example of an equalizer. The equalizer illustrated in FIG. 2 may be the equalizer 101 illustrated in FIG. 1. While an example of a single-ended signal is illustrated in FIG. 1, an example of a differential signal is illustrated in FIG. 2. Differential input data signals Di and /Di are signals having phases that are inverse to each other. Differential output data signals Di1 and /Di1 are signals having phases that are inverse to each other. The equalizer 101 receives the differential input data signals Di and /Di and outputs the differential output data signals Di1 and /Di1.

A resistor 201 is coupled between a power supply node and a node of the output data signal /Di1. A resistor 202 is coupled between the power supply node and a node of the output data signal Di1. In an n-channel field effect transistor 203, the drain is coupled to the node of the output data signal /Di1 and the gate is coupled to a node of an input data signal Di. In an n-channel field effect transistor 204, the drain is coupled to the node of the output data signal Di1 and the gate is coupled to a node of the input data signal /Di. A variable resistor 205 is coupled between the source of the transistor 203 and the source of the transistor 204 and has a resistance varying in accordance with the equalization coefficient Cz. A variable capacitor 206 is coupled between the source of the transistor 203 and the source of the transistor 204 and has a capacitance varying in accordance with the equalization coefficient Cz. A constant current source 207 is coupled between a coupling point between the sources of the transistors 203 and 204 and a ground potential node.

FIG. 2 illustrates a continuous time linear equalizer (CTLE) as an example of the equalizer 101. In this circuit, with the variable resistor 205 between the sources of the differential input transistors 203 and 204, the gain of the low-frequency component is decreased and the high-frequency component is emphasized equivalently, and thus the high-frequency component of an input data signal is restored. The gain and frequency characteristics to be emphasized may be adjusted in such a way that the capacitance of the variable capacitor 206 and/or the resistance of the variable resistor 205 are/is varied by the equalization coefficient Cz.

Figure 3:
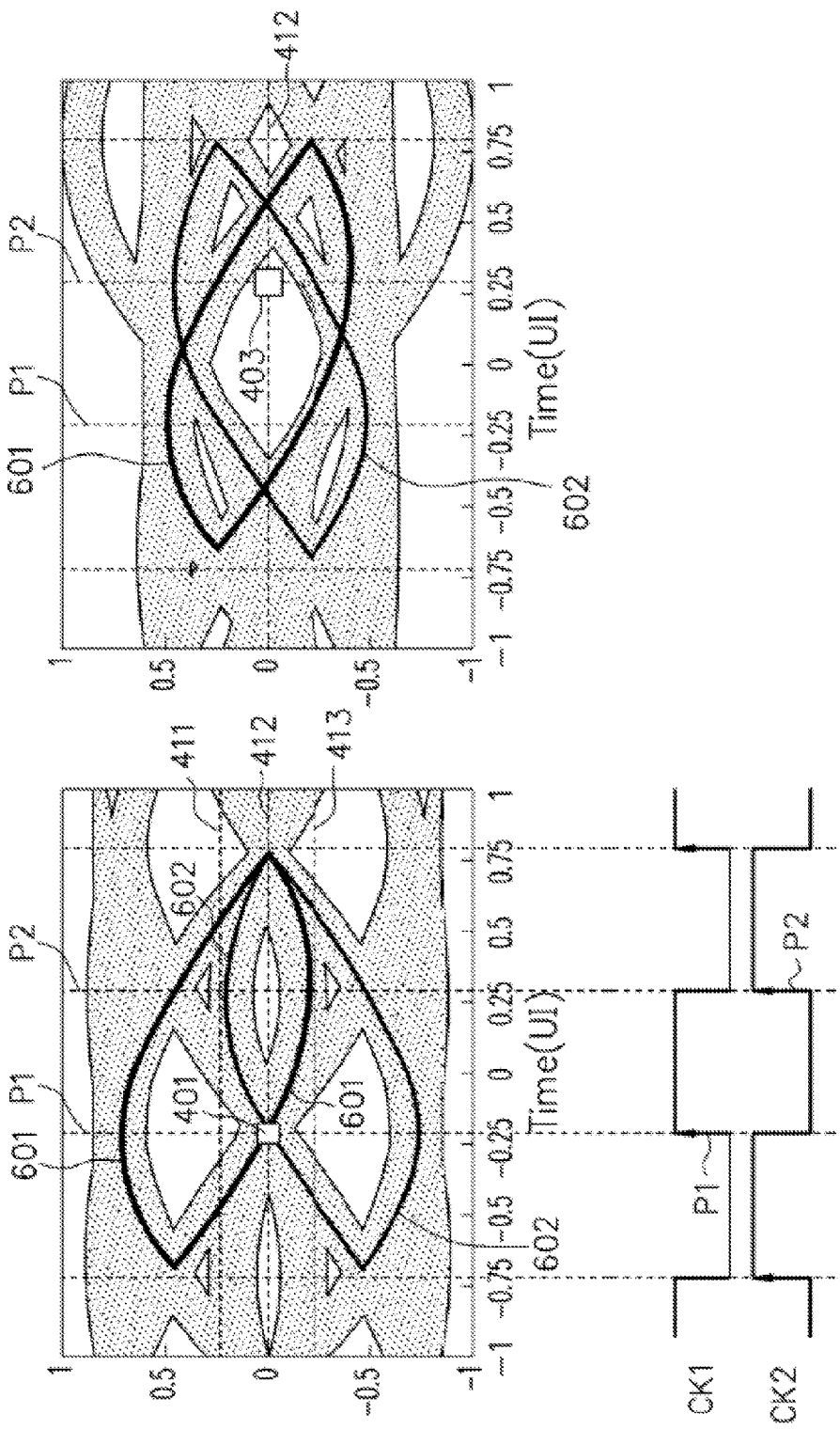
FIG. 3A and FIG. 3B illustrate an example of eye pattern of a data signal.

A first phase adjustment circuit 110 illustrated in FIG. 1 outputs a first clock signal CK1. A second phase adjustment circuit 111 outputs a second clock signal CK2. FIG. 3A and FIG. 3B illustrate an example of an eye pattern of a data signal. As illustrated in FIG. 3A, the first clock signal CK1 and the second clock signal CK2 may be signals that shift from each other by 0.5 UI.

A decision feedback equalizer 102 equalizes the input data signal Di1 and performs a binary decision thereon using an equalization coefficient Cd in synchronization with the second clock signal CK2 and outputs binary center data Dd. In FIG. 3A, the decision feedback equalizer 102, in synchronization with a rising edge of the second clock signal CK2, performs a binary decision on the DFE input data signal Di1 at a timing P2 and thus outputs the center data Dd. The center data Dd is either a binary 0 or 1. For example, data "1" may be data having a positive amplitude, and data "0" may be data having a negative amplitude.

Figure 4:
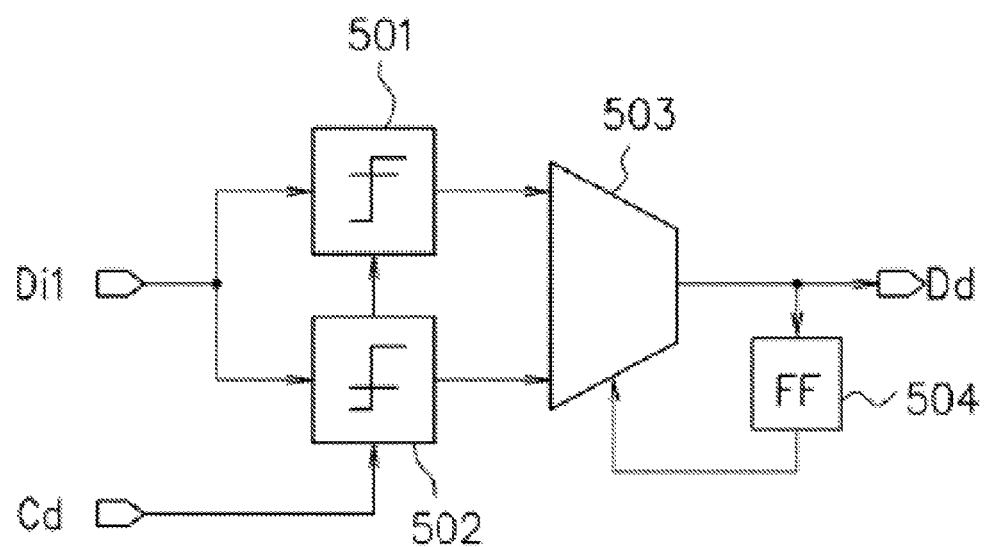
FIG. 4 illustrates an example of a decision feedback equalizer.

FIG. 4 illustrates an example of a decision feedback equalizer. The decision feedback equalizer illustrated in FIG. 4 may be the decision feedback equalizer 102 illustrated in FIG. 1. In the decision feedback equalizer 102, the equalization coefficient Cd is input, an equalization coefficient "+Cd" is provided to a comparison circuit 501, and an equalization coefficient "−Cd" is provided to a comparison circuit 502. The comparison circuit 501 outputs a comparison result of the input data signal Di1 with the equalization coefficient "+Cd". For example, the comparison circuit 501 outputs data "1" if the input data signal Di1 is greater than the equalization coefficient "+Cd", and outputs data "0" if the input data signal Di1 is less than the equalization coefficient "+Cd". The comparison circuit 502 outputs a comparison result of the input data signal Di1 with the equalization coefficient "−Cd". For example, the comparison circuit 502 outputs data "1" if the input data signal Di1 is greater than the equalization coefficient "−Cd", and outputs data "0" if the input data signal Di1 is less than the equalization coefficient "−Cd". A selector 503 selects output data of the comparison circuit 501 if data stored in a flip-flop circuit 504 is "1", and selects output data of the comparison circuit 502 if data stored in the flip-flop circuit 504 is "0". Then, the selector 503 outputs the binary data Dd. The flip-flop circuit 504 stores the output data Dd of the selector 503. For example, the selector 503 selects either output data of the comparison circuit 501 or output data of the comparison circuit 502 depending on the preceding output data Dd stored in the flip-flop circuit 504.

The decision feedback equalizer 102 in FIG. 4 may be a one-tap decision feedback equalizer. The selector 503 performs selection depending on the preceding output data Dd and thus may perform high-speed processing. The number of taps of the decision feedback equalizer 102 may be one or two or more. For example, in the two-tap decision feedback equalizer 102, four comparison circuits 501, 502, and so on are provided, and one piece of output data of the four comparison circuits 501, 502, and so on is selected depending on the one-bit preceding output data Dd and the two-bit preceding output data Dd. Similarly, in the m-tap decision feedback equalizer 102, $2^m$ comparison circuits 501, 502, and so on may be provided.

FIG. 3A illustrates an eye pattern of the input data signal Di1. An eye pattern is a pattern formed by overlaying a plurality of data transition patterns on a time base. The horizontal axis represents time, and the vertical axis represents the amplitude value. Time on the horizontal axis is expressed in unit intervals (UIs). One UI is a one-bit time interval of the input data signal Di1 and is a time interval between two adjacent data boundary times (data transition times). A timing P1 of a rising edge of the first clock signal CK1 is a boundary data timing representing the timing of a boundary between two adjacent pieces of data. A timing P2 of a rising edge of the second clock signal CK2 is a center data timing representing the timing of the center of one piece of data. There is a phase difference of 0.5 UI between the timings P1 and P2.

Data transition 601 represents transition, in a data pattern "11001100 . . . ", from the previous data "1" to the current data "1" or "0". In this case, a center amplitude value 411 of the data transition 601 is positioned above an amplitude value "0". Consequently, when the previous data is "1", the comparison circuit 501 outputs data "1" if the input data signal Di1 is greater than the equalization coefficient 411 (="+Cd"), and outputs data "0" if the input data signal Di1 is less than the equalization coefficient 411 (="+Cd").

Data transition 602 represents transition, in the data pattern "11001100 . . . ", from the previous data "0" to the current data "1" or "0". In this case, a center amplitude value 413 of the data transition 602 is positioned below the amplitude value "0". Consequently, when the previous data is "0", the comparison circuit 502 outputs data "1" if the input data signal Di1 is greater than the equalization coefficient 413 (="−Cd"), and outputs data "0" if the input data signal Di1 is less than the equalization coefficient 413 (="−Cd").

A decision circuit 103 illustrated in FIG. 1 performs a binary decision on the input data signal Di1 in synchronization with the first clock signal CK1 and outputs the data obtained through the binary decision as boundary data Db. For example, the decision circuit 103 outputs the boundary data Db of "1" if the amplitude value of the input data signal Di1 is larger than a threshold for determining "0" or "1", and outputs the boundary data Db of "0" if the amplitude value of the input data signal Di1 is smaller than the threshold for determining "0" or "1". In FIG. 3A, in synchronization with a rising edge of the first clock signal CK1, the decision circuit 103 performs a binary decision on the input data signal Di1 at the timing P1 and thus outputs boundary data 401 (Db).

FIG. 3B illustrates an eye pattern of a data signal after equalization of the decision feedback equalizer 102. The decision feedback equalizer 102 performs processing equivalent to a binary decision, using a threshold 412 of an amplitude value "0". The data 401 at the timing P1 illustrated in FIG. 3A is the boundary data Db. Data 403 at the timing P2 illustrated in FIG. 3B is the center data Dd. In FIG. 3A, the center data timing P2 is positioned at the center phase of the data. In FIG. 3B, the data 403 at the center data timing P2 is shifted to a position behind the center phase of the data (a position to the right thereof). This is caused by equalization of the decision feedback equalizer 102. If the decision feedback equalizer 102 performs a decision on data at a position of the center phase of the data, the decision error rate may decrease, whereas if the decision feedback equalizer 102 performs a decision on the data 403 at the shifted timing P2, the decision error rate may increase. Therefore, adjusting the decision timing P2 of the center data 403 may reduce the decision error rate of the decision feedback equalizer 102.

A decision circuit 104 illustrated in FIG. 1, in synchronization with the second clock signal CK2, performs a binary decision on the input data signal Di1 based on a threshold Ce and outputs data obtained through the binary decision as amplitude data De. For example, the decision circuit 104 outputs the amplitude data De of "1" if the amplitude value of the input data signal Di1 is larger than the threshold Ce, and outputs the amplitude data De of "0" if the amplitude value of the input data signal Di1 is smaller than the threshold value Ce.

A first demultiplexing circuit 106 demultiplexes output data of the decision circuit 103 and outputs boundary data Bs1. A second demultiplexing circuit 105 demultiplexes output data of the decision feedback equalizer 102 and outputs center data Do. A third demultiplexing circuit 107 demultiplexes output data of the decision circuit 104 and outputs amplitude data De1. For example, the demultiplexing circuits 105 to 107 each convert high-frequency serial signals to low-frequency parallel signals. For the output data of the demultiplexing circuits 105 to 107, the data rates are low. Therefore, low-speed processing may be performed in a phase detection circuit 108, a phase control circuit 114, and an equalization control circuit 112 subsequent to the demultiplexing circuits 105 to 107. The center data Do is output data of the receiving circuit.

The phase detection circuit 108, to which the center data Do and the boundary data Bs1 are input, detects phase information Ph of the input data signal Di1 based on the center data Do and the boundary data Bs1, and outputs the phase information Ph.

FIG. 5A illustrates an example of a phase detection circuit. FIG. 5B to FIG. 5D illustrates an example of data of a phase detection circuit. The phase detection circuit illustrated in FIG. 5A may be the phase detection circuit 108 illustrated in FIG. 1. The phase detection circuit 108 includes exclusive or (XOR) circuits 901, 902, and 903, AND circuits 904 and 905, and a low-pass filter 906. The low-pass filter 906 includes counters 907 and 908. As depicted in FIG. 5C and FIG. 5D, center data Do [0] is the center data of a first cycle. Center data Do [1] is the center data of a subsequent second cycle. Boundary data Bs1 [0] is the boundary data Bs1 between center data Do [0] and center data Do [1]. The XOR circuit 901 outputs an XOR of center data Do [0] and center data Do [1]. The XOR circuit 902 outputs an XOR of center data Do [0] and boundary data Bs1 [0]. The XOR circuit 903 outputs an XOR of center data Do [1] and boundary data Bs1 [0]. The AND circuit 904 outputs AND data of the output data of the XOR circuit 901 and the output data of the XOR circuit 902 as an up bit UP. The AND circuit 905 outputs AND data of the output data of the XOR circuit 901 and the output data of the XOR circuit 903 as a down bit DN. With respect to a logic circuit including the XOR circuits 901, 902, and 903 and the AND circuits 904 and 905, as depicted in FIG. 5B, data Do [0], data Do [1], and data Bs1 [0] are input thereto and two bits, the up bit UP and the down bit DN, are output therefrom.

FIG. 5C depicts an example of the case where the phase of boundary data Bs1 [0] is ahead of the boundary phase (data transition phase). For example, center data Do [0] and boundary data Bs1 [0] is "1", and the subsequent center data Do [1] is "0". In this case, since the phase of boundary data Bs1 [0] is ahead of the boundary phase (data transition phase), a down bit DN of "1" is output in order to retard the phase of sampling.

FIG. 5D depicts an example of the case where the phase of boundary data Bs1 [0] is behind the boundary phase (data transition phase). For example, center data Do [0] is "0", and the boundary data Bs1 [0] and the subsequent center data Do [1] is "1". In this case, since the phase of boundary data Bs1 [0] is behind the boundary phase (data transition phase), an up bit UP of "1" is output in order to advance the phase of sampling.

The phase detection circuit 108, when a change occurs in data value, detects a shift in phase depending upon whether boundary data Bs1 [0] is the same either as the precedent center data Do [0] or as the subsequent center data Do [1]. Although a composition of two successive bits of data is illustrated in FIG. 5A to FIG. 5D for the sake of convenience, phase detection is performed for a plurality of bits of data provided from the demultiplexing circuits 105 and 106.

The low-pass filter 906 includes the counters 907 and 908, an adder 909, and a flip flop 910. The up bit UP and the down bit DN are filtered with the counters 907 and 908, and, in the adder 909, the output value of the counter 908 and phase information Ph are added together and the output value of the counter 907 is subtracted. At the time of initialization, the low-pass filter 906 outputs the phase information Ph having an initial value. The phase information Ph is phase information of the boundary phase of the input data signal Di1.

The counter 907 counts the number of times the up bit UP of "1" is output. When the number of times counted by the counter 907 reaches, for example, 16, the counter 907 outputs "1". Then, the counter 907 resets the number of counts to zero and continues to output "0" until the number of counts reaches 16 again.

The counter 908 counts the number of times the down bit DN of "1" is output. When the number of times counted by the counter 908 reaches, for example, 16, the counter 908 outputs "1". Then, the counter 908 resets the number of counts to zero and continues to output "0" until the number of counts reaches 16 again.

The output value of the adder 909 is stored in the flip flop 910 and then, later by one cycle of a flip flop drive clock, is output as the phase information Ph. For example, when the counter 907 outputs "1", the adder 909 may add "−1" to the one-cycle preceding phase information Ph and the flip flop 910 may output a value obtained by the addition as the phase information Ph. When the counter 908 outputs "1", the adder 909 may add "+1" to the one-cycle preceding phase information and the flip flop 910 may output a value obtained by the addition as the phase information Ph. When both the counters 907 and 908 output "0", the one-cycle preceding phase information Ph may be output as is as the phase information Ph.

The equalization control circuit 112 illustrated in FIG. 1 includes an amplitude monitor 113. The center data Do and the amplitude data De1 are input to the equalization control circuit 112, and the equalization coefficient Cz, the threshold Ce, the equalization coefficient Cd, and an amplitude value EREF are output therefrom. The equalization control circuit 112 performs adaptive equalization control for sequentially optimizing the equalization coefficient Cd and the like, for example, by using a least mean square (LMS) algorithm or the like. The amplitude monitor 113 outputs the amplitude value EREF to the phase control circuit 114. The equalization control circuit 112 changes the threshold Ce between "−1" and "+1" at a slower rate than the bit rate of the input data signal Di and stores the amplitude data De1 and the center data Do at that point, thereby obtaining the amplitude value EREF of each data transition pattern.

The phase control circuit 114 outputs a request signal CT for the amplitude value of a specified data transition pattern to the equalization control circuit 112. The equalization control circuit 112 outputs the amplitude value EREF of the specified data transition pattern to the phase control circuit 114. The phase control circuit 114 receives the amplitude value EREF and the phase information Ph and outputs phase difference information Sh of the center data. The phase difference information Sh is information on a phase difference after correction of the center data with respect to the phase information Ph on the boundary phase. In the case of FIG. 3B, the phase difference information after correction of the center data is about 0 UI, and the phase difference information Sh corresponds to a value obtained by subtracting the boundary phase P1 from the phase difference information (about 0 UI) after correction of the center data. For example, when there is no phase shift in the center data made by the decision feedback equalizer 102, the phase difference information Sh has a value corresponding to 0.5 UI.

The first phase adjustment circuit 110 adjusts the phase of the first clock signal CK1 in accordance with the phase information Ph by using a reference clock signal CK. When the up bit UP is "1", the phase of the first clock signal CK1 is controlled so as to be advanced. When the down bit DN is "1", the phase of the first clock signal CK1 is controlled so as to be retarded. Therefore, the phases of the boundary data Bs1 [0] illustrated in FIG. 5C and FIG. 5D are controlled so as to match the boundary phase (data transition phase).

The adder 109 adds the phase information Ph and the phase difference information Sh together and outputs phase information Ph1. The second phase adjustment circuit 111 adjusts the phase of the second clock signal CK2 in accordance with the phase information Ph1 by using the reference clock signal CK. The adder 109 corrects the phase of the center data 403 depicted in FIG. 3B to an appropriate phase by adding the phase difference information Sh.

Figure 6:
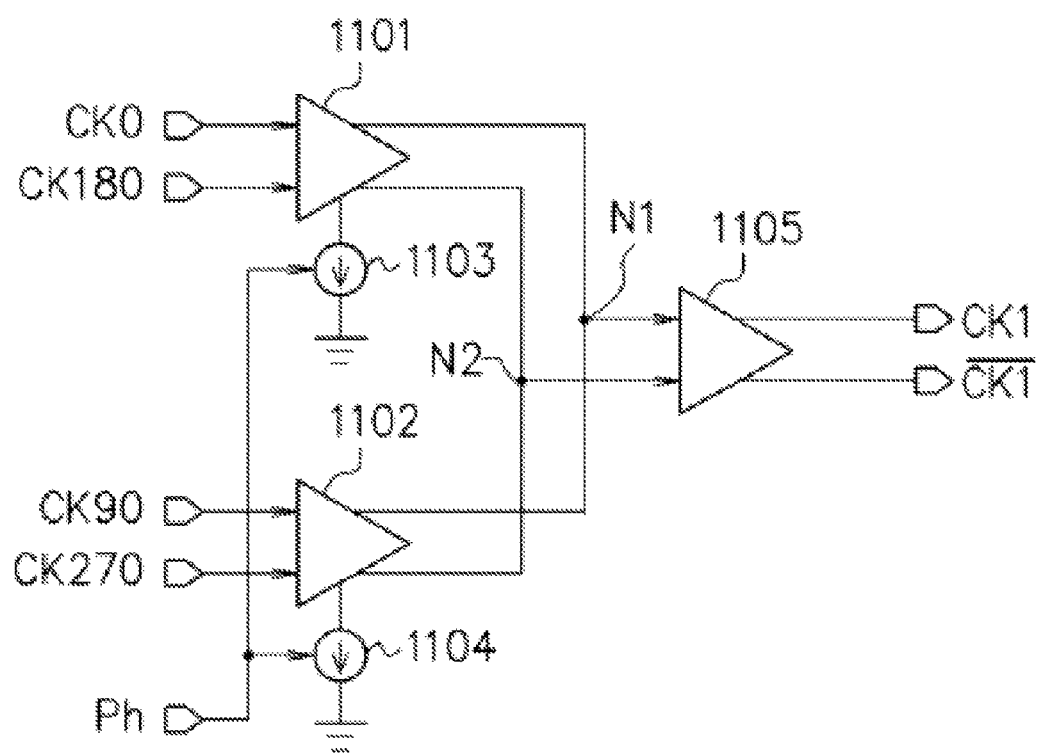
FIG. 6 illustrates an example of a first phase adjustment circuit.

FIG. 6 illustrates an example of a phase adjustment circuit. The phase adjustment circuit illustrated in FIG. 6 may be the first phase adjustment circuit 110 illustrated in FIG. 1. The first phase adjustment circuit 110 may be, for example, a phase interpolation circuit. Four-phase reference clock signals CK0, CK90, CK180, and CK270 may correspond to the reference clock signal CK illustrated in FIG. 1. The clock signal CK0 is a clock signal having a phase of 0 degrees, the clock signal CK90 is a clock signal having a phase of 90 degrees, the clock signal CK180 is a clock signal having a phase of 180 degrees, and the clock signal CK270 is a clock signal having a phase of 270 degrees. A differential amplifier 1101, which is coupled to a current source 1103, amplifies the reference clock signals CK0 and CK180 and outputs differential clock signals to nodes N1 and N2. A differential amplifier 1102, which is coupled to a current source 1104, amplifies the reference clock signals CK90 and CK270 and outputs differential clock signals to the nodes N1 and N2. A differential amplifier 1105 amplifies the differential clock signals of the nodes N1 and N2 and outputs differential clock signals CK1 and /CK1. The differential clock signals CK1 and /CK1 are signals having phases that are inverse to each other and may correspond to the first clock signal CK1 illustrated in FIG. 1.

In current sources 1103 and 1104, the current ratio is controlled in accordance with the phase information Ph. Through assigning weights in accordance with the current ratio, the output signal of the differential amplifier 1101 and the output signal of the differential amplifier 1102 are added in the nodes N1 and N2.

When the current ratio of the current source 1103 to the current source 1104 is 1:0, the first clock signal CK1 has substantially the same phase as the clock signal CK0 of 0 degrees. The first clock signal /CK1 has substantially the same phase as the clock signal CK180 of 180 degrees.

When the current ratio of the current source 1103 to the current source 1104 is 0:1, the first clock signal CK1 has substantially the same phase as the clock signal CK90 of 90 degrees. The first clock signal /CK1 has substantially the same phase as the clock signal CK270 of 270 degrees.

The first clock signal CK1 or /CK1 having any phase between 0 degrees to 360 degrees is produced by controlling the current ratio of the current source 1103 to the current source 1104 in accordance with the phase information Ph.

The configuration of the second phase adjustment circuit 111 may be similar to the configuration of the first phase adjustment circuit 110.

Figure 11:
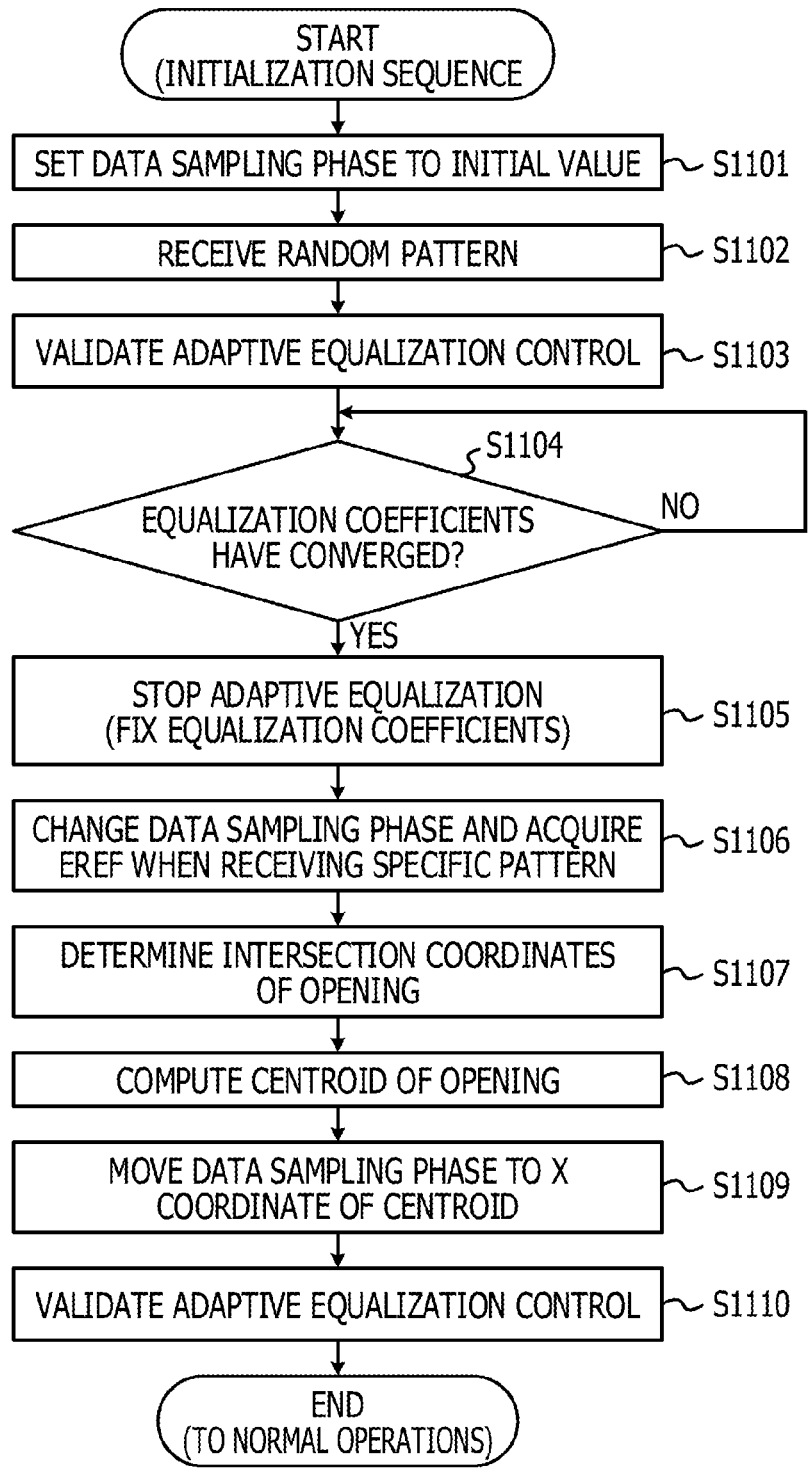
FIG. 11 illustrates an example of a method for controlling a receiving circuit.

FIG. 11 illustrates an example of a method for controlling a receiving circuit. Operations S1101 to S1110 are processing of an initialization sequence. In operation S1101, the second phase adjustment circuit 111 outputs the second clock signal CK2 in accordance with the phase information Ph1 of an initial value. For example, the phase difference information Sh of the initial value may be a value corresponding to 0.5 UI.

In operation S1102, the receiving circuit receives a random pattern as the input data signal Di from the transmission circuit. In operation S1103, the receiving circuit validates adaptive equalization control of the equalization control circuit 112. In operation S1104, the receiving circuit waits until the equalization coefficients Cz and Cd have converged, and, if the equalization coefficients Cz and Cd have converged, the process proceeds to operation S1105.

In operation S1105, the receiving circuit stops adaptive equalization control of the equalization control circuit 112 and fixes the equalization coefficients Cz and Cd. Next, in operation S1106, the second phase adjustment circuit 111 changes the phase of the second clock signal CK2 at a slower rate than the bit rate of the input data signal Di, for example, within the range of 1 UI. At that point, based on the request signal CT, the phase control circuit 114 acquires the amplitude value EREF of a specific pattern from the equalization control circuit 112.

Figure 7:
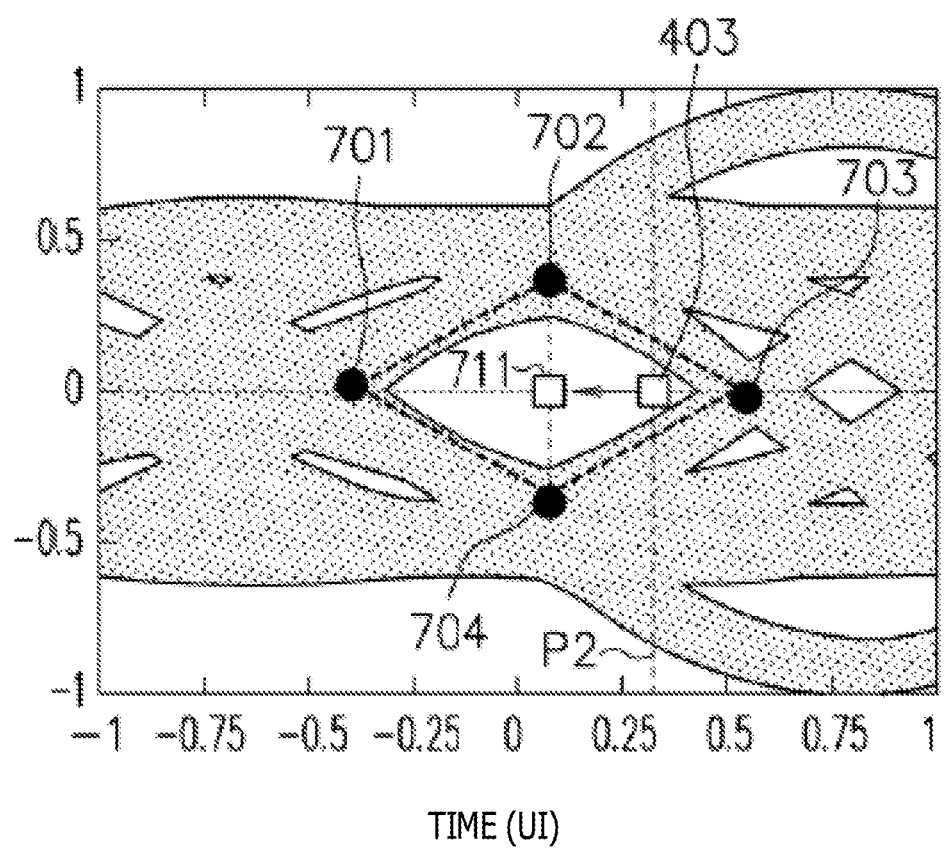
FIG. 7 illustrates an example of an eye pattern of a data signal.

FIG. 7 illustrates an example of an eye pattern of a data signal. In FIG. 7, as in FIG. 3B, an eye pattern of a data signal after equalization of the decision feedback equalizer 102 is illustrated. In the case illustrated in FIG. 7, operation S1106 may be performed. The opening of the eye pattern may be approximated by a quadrilateral with a left intersection 701, an upper intersection 702, a right intersection 703, and a lower intersection 704. The quadrilateral may be substantially a rhombus. The second phase adjustment circuit 111 changes the phase of the second clock signal CK2 in a range of 1 UI including the intersections 701 to 703 at a low speed. At that point, the equalization control circuit 112 changes the threshold Ce in a range from "−1" to "+1". Therefore, the amplitude monitor 113 acquires and stores the amplitude value of each phase.

FIG. 8A to FIG. 8D illustrate an example of a specific pattern. In the case illustrated in FIG. 8A, the amplitude value of a specific pattern Wa of "110" is acquired. In the specific pattern Wa of "110", binary center data at about −1 UI is "1", binary center data at about 0 UI is "1", and binary center data at about +1 UI is "0". The phase control circuit 114 outputs a request signal CT for the amplitude value of the specific pattern Wa to the equalization control circuit 112. The equalization control circuit 112 outputs the amplitude value EREF of each phase of the specific pattern Wa in accordance with the center data Do and the amplitude value of each phase by using the amplitude monitor 113 to the phase control circuit 114.

Figure 8A:
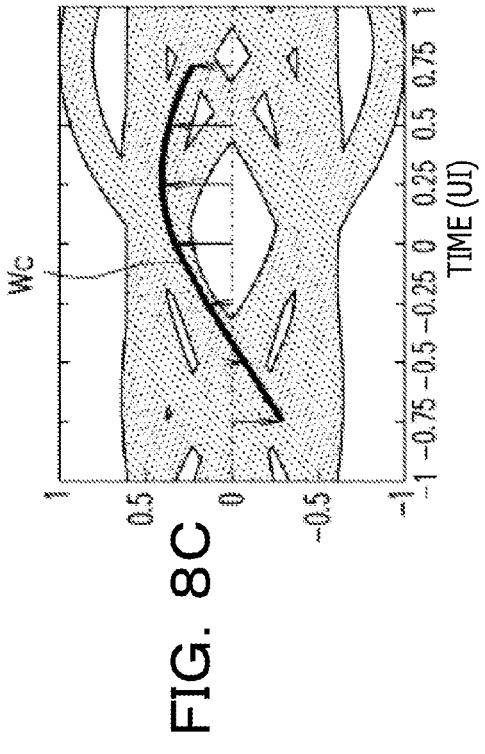
FIG. 8A to FIG. 8D illustrate an example of a specific pattern.
Figure 8B:
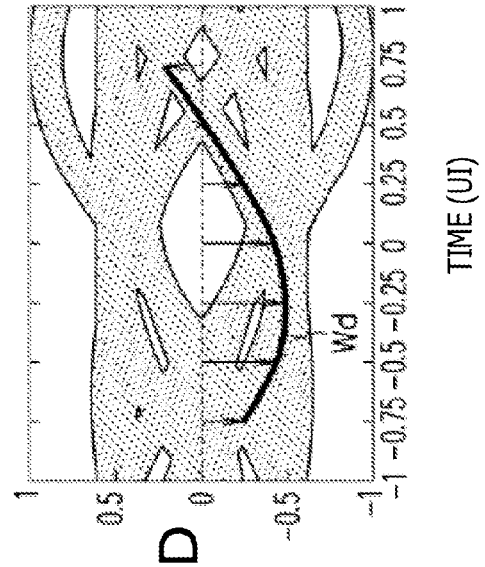

In the case illustrated in FIG. 8B, the amplitude value of a specific pattern Wb of "101" is acquired. In the specific pattern Wb of "101", binary center data at about −1 UI is "1", binary center data at about 0 UI is "0", and binary center data at about +1 UI is "1". The phase control circuit 114 outputs the request signal CT of the amplitude value of the specific pattern Wb to the equalization control circuit 112. The equalization control circuit 112 outputs the amplitude value EREF of each phase of the specific pattern Wb in accordance with the center data Do and the amplitude value of each phase by using the amplitude monitor 113 to the phase control circuit 114.

Figure 8C:
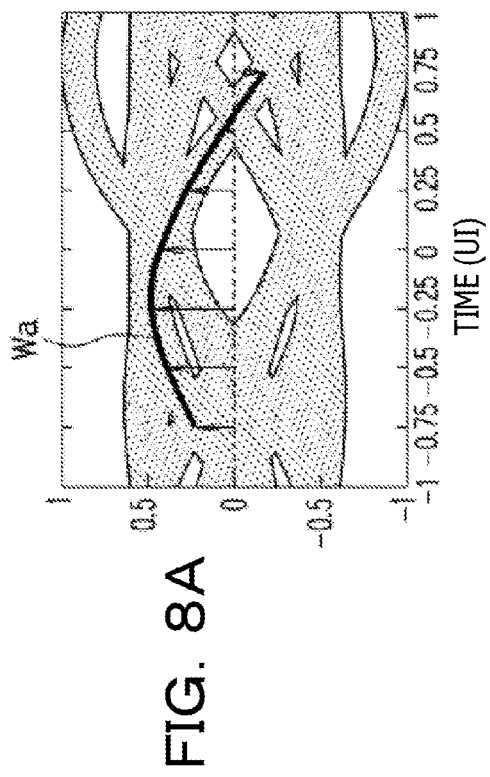

In the case illustrated in FIG. 8C, the amplitude value of a specific pattern Wc of "010" is acquired. In the specific pattern Wc of "010", binary center data at about −1 UI is "0", binary center data at about 0 UI is "1", and binary center data at about +1 UI is "0". The phase control circuit 114 outputs a request signal CT for the amplitude value of the specific pattern Wc to the equalization control circuit 112. The equalization control circuit 112 outputs the amplitude value EREF of each phase of the specific pattern Wc in accordance with the center data Do and the amplitude value of each phase by using the amplitude monitor 113 to the phase control circuit 114.

Figure 8D:
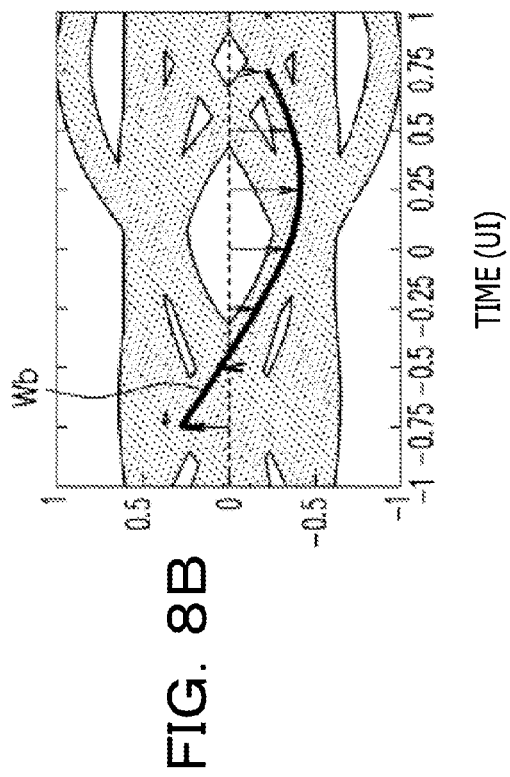

In the case illustrated in FIG. 8D, the amplitude value of a specific pattern Wd of "001" is acquired. In the specific pattern Wd of "001", binary center data at about −1 UI is "0", binary center data at about 0 UI is "0", and binary center data at about +1 UI is "1". The phase control circuit 114 outputs a request signal CT for the amplitude value of the specific pattern Wd to the equalization control circuit 112. The equalization control circuit 112 outputs the amplitude value EREF of each phase of the specific pattern Wd in accordance with the center data Do and the amplitude value of each phase by using the amplitude monitor 113 to the phase control circuit 114.

In operation S1107 illustrated in FIG. 11, the phase control circuit 114 determines the coordinates of the intersections 701 to 704 (FIG. 7) of the opening of the eye pattern.

Figure 9:
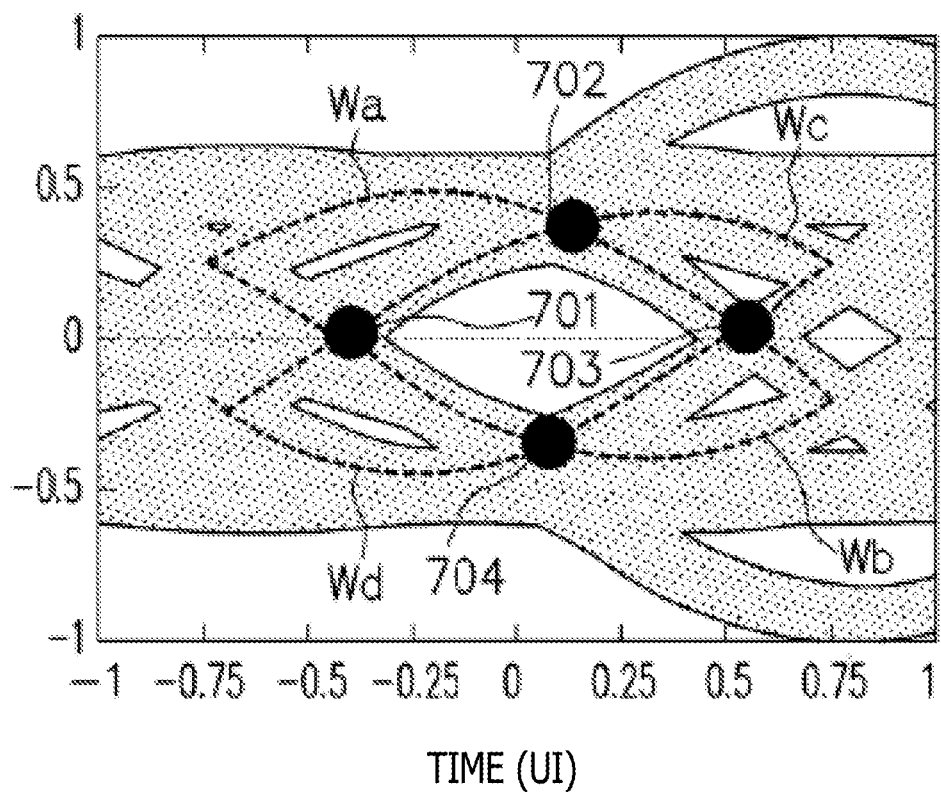
FIG. 9 illustrates an example of an eye pattern of a data signal.

FIG. 9 illustrates an example of an eye pattern of a data signal. FIG. 9, similarly to FIG. 7, illustrates an eye pattern of a data signal after equalization of the decision feedback equalizer 102. In the case illustrated in FIG. 9, operation S1107 may be performed. The specific pattern Wa, as illustrated in FIG. 8A, may be a data pattern of "110". The specific pattern Wb, as illustrated in FIG. 8B, may be a data pattern of "101". The specific pattern Wc, as illustrated in FIG. 8C, may be a data pattern of "010". The specific pattern Wd, as illustrated in FIG. 8D, may be a data pattern of "001".

The coordinates of the left intersection 701 are computed. The phase control circuit 114 determines the intersection of the specific pattern Wb and the specific pattern Wc as the intersection 701. For example, the phase control circuit 114 determines a phase at which the amplitude value of the specific pattern Wb and the amplitude value of the specific pattern Wc are substantially the same. Using the phase at that point as the x-coordinate value and the amplitude value at that point as the y-coordinate value, the coordinates of the intersection 701 are determined.

The coordinates of the upper intersection 702 are computed. The phase control circuit 114 determines the intersection of the specific pattern Wa and the specific pattern Wc as the upper intersection 702. For example, the phase control circuit 114 determines a phase at which the amplitude value of the specific pattern Wa and the amplitude value of the specific pattern Wc are substantially the same. Using the phase at that point as the x-coordinate value and the amplitude value at that point as the y-coordinate value, the coordinates of the intersection 702 are determined.

The coordinates of the right intersection 703 are computed. The phase control circuit 114 determines the intersection of the specific pattern Wa and the specific pattern Wd as the right intersection 703. For example, the phase control circuit 114 determines a phase at which the amplitude value of the specific pattern Wa and the amplitude value of the specific pattern Wd are substantially the same. Using the phase at that point as the x-coordinate value and the amplitude value at that point as the y-coordinate value, the coordinates of the intersection 703 are determined.

The coordinates of the lower intersection 704 are computed. The phase control circuit 114 determines the intersection of the specific pattern Wb and the specific pattern Wd as the lower intersection 704. For example, the phase control circuit 114 determines a phase at which the amplitude value of the specific pattern Wb and the amplitude value of the specific pattern Wd are substantially the same. Using the phase at that point as the x-coordinate value and the amplitude value at that point as the y-coordinate value, the coordinates of the intersection 704 are determined.

Figure 10:
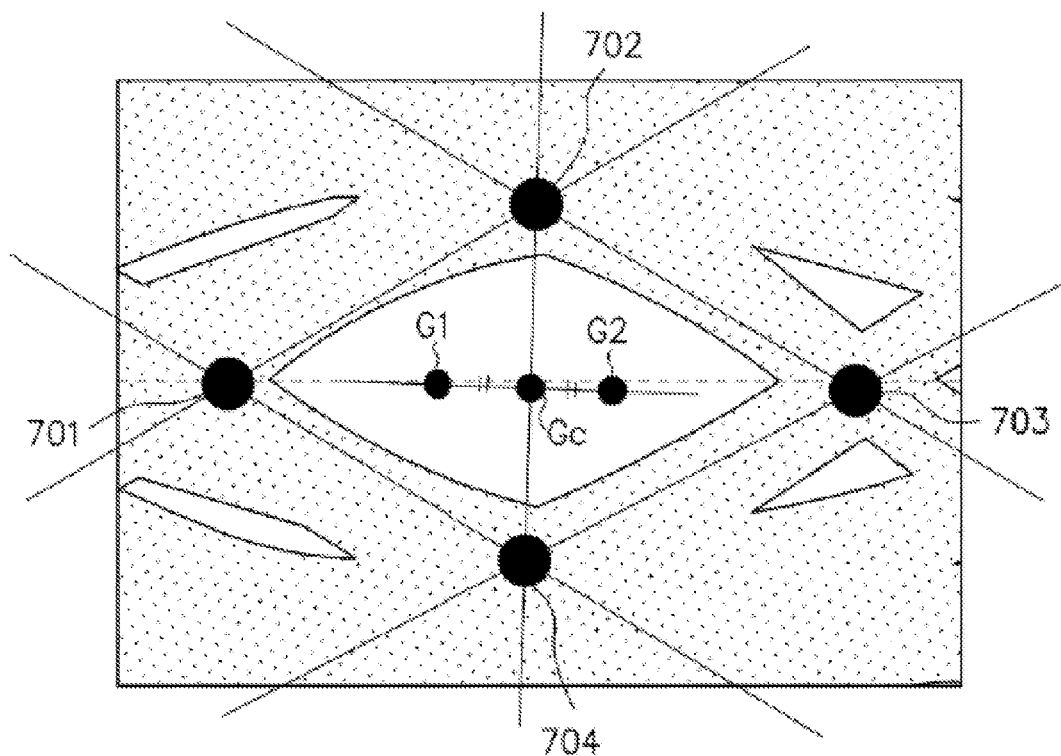
FIG. 10 illustrates an example of an eye pattern of a data signal.

In operation S1108 illustrated in FIG. 11, the phase control circuit 114 computes a centroid Gc of the opening of the eye pattern (FIG. 10).

FIG. 10 illustrates an example of an eye pattern of a data signal. In FIG. 10, as in FIG. 9, the eye pattern of a data signal after equalization of the decision feedback equalizer 102 is illustrated. In the case illustrated in FIG. 10, operation S1108 may be performed. The phase control circuit 114 computes a centroid G1 of a triangle with the intersections 701, 702, and 704. Next, the phase control circuit 114 computes a centroid G2 of a triangle with the intersections 702, 703, and 704. Next, the phase control circuit 114 determines the midpoint of a line joining the centroid G1 and the centroid G2 as the centroid Gc of the opening of the eye pattern. The centroid Gc is the centroid of the quadrilateral with the four intersections 701 to 704.

In operation S1109 illustrated in FIG. 11, the phase control circuit 114 outputs a phase difference of the centroid Gc with respect to the phase information Ph of the boundary data, as the phase difference information Sh. The phase difference information Sh corresponds to a value obtained by subtracting the phase information Ph from the phase of the centroid Gc. The adder 109 adds the phase information Ph and the phase difference information Sh and outputs the phase information Ph1. The phase information Ph1 corresponds to the phase of the centroid Gc. The second phase adjustment circuit 111 controls the phase of the second clock signal CK2 in accordance with the phase information Ph1. Therefore, the phase of a rising edge of the second clock signal CK2 is the phase of the centroid Gc. The decision feedback equalizer 102 performs a binary decision in synchronization with a rising edge of the second clock signal CK2 and therefore outputs the center data 711 (FIG. 7) at the phase of the centroid Gc.

In the case where the phase control circuit 114 is not provided, the phase difference information Sh is fixed to 0.5 UI. Therefore, as illustrated in FIG. 7, the decision feedback equalizer 102 outputs the center data 403 (FIG. 7) at a phase shifted from the centroid Gc of the opening of the eye pattern. This may increase the decision error rate.

When the phase control circuit 114 is provided, as illustrated in FIG. 7, the decision feedback equalizer 102 outputs the center data 711 (FIG. 7) at the phase of the centroid Gc of the opening of the eye pattern. Therefore, the decision error rate may be reduced.

In operation S1110 illustrated in FIG. 11, the receiving circuit validates adaptive equalization control of the equalization control circuit 112. Then, the receiving circuit performs normal operations. In normal operations, the receiving circuit receives data as the input data signal Di from the transmission circuit. The phase difference information Sh is fixed, and the second phase adjustment circuit 111 outputs the second clock signal CK2 in accordance with the phase information Ph1.

The second phase adjustment circuit 111 adjusts the phase of the second clock signal CK2 in accordance with the phase difference information Sh output by the phase control circuit 114. Therefore, the decision feedback equalizer 102 performs a decision on the center data with an appropriate phase. This may reduce the decision error rate.

Figure 12:
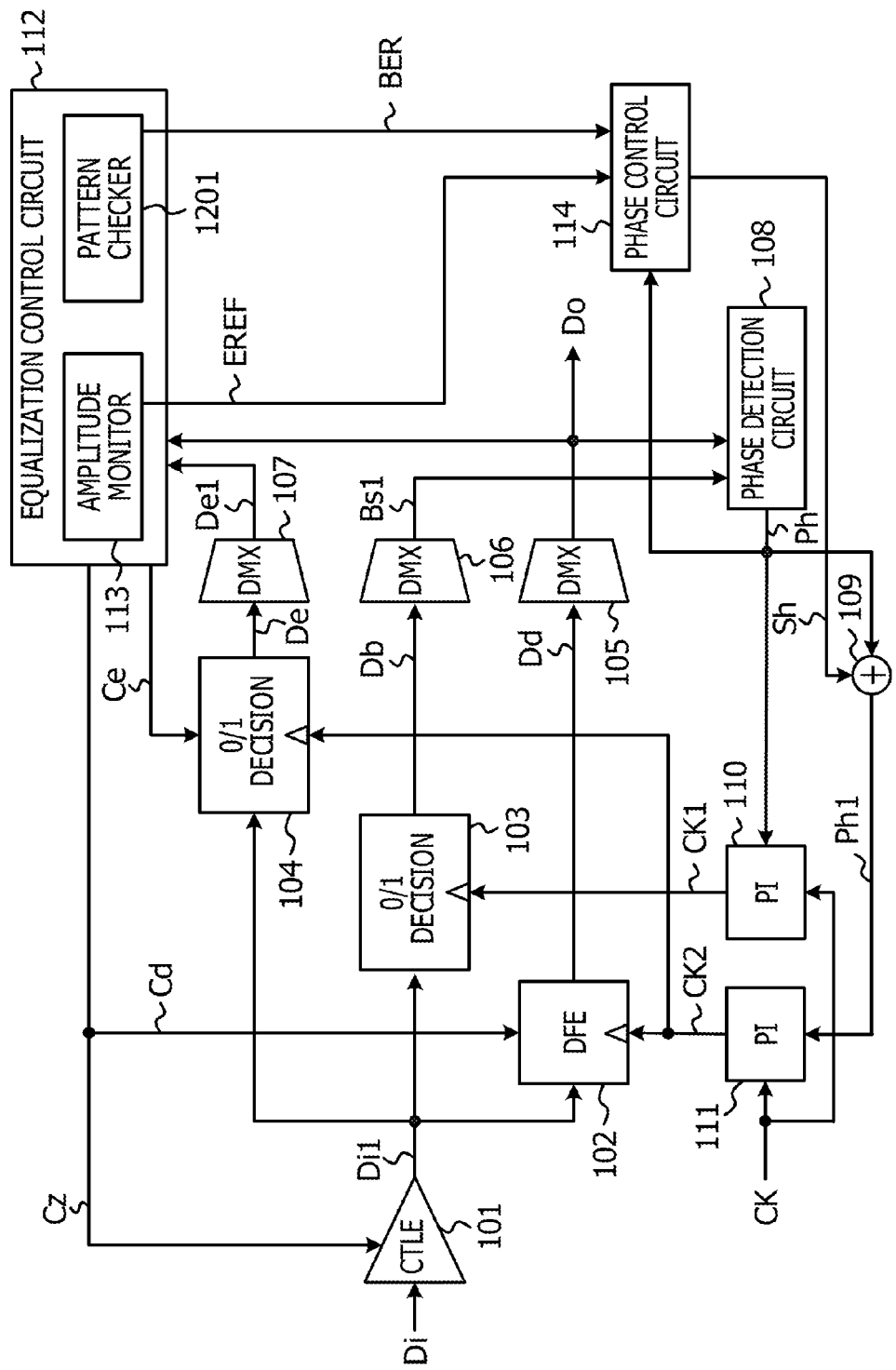
FIG. 12 illustrates an example of a receiving circuit.

FIG. 12 illustrates an example of a receiving circuit. In the receiving circuit illustrated in FIG. 12, a pattern checker 1201 is added to the receiving circuit illustrated in FIG. 1. Hereinafter, points at which the receiving circuit illustrated in FIG. 12 differs from the receiving circuit illustrated in FIG. 1 will be described, and redundant description of similar configurations may be omitted or reduced. The pattern checker 1201 is provided within the equalization control circuit 112. In the initialization sequence, the receiving circuit receives a pseudo-random pattern as the input data signal Di from the transmission circuit. The pseudo-random pattern may be a known pattern. The pattern checker 1201 may memorize an expected value of the known pseudo-random pattern. The pattern checker 1201 determines that there is no error if the center data Do is the same as the expected value. If the center data Do is different from the expected value, the pattern checker 1201 determines that there is an error and outputs the bit error rate BER to the phase control circuit 114. The phase control circuit 114 outputs the phase difference information Sh in accordance with the bit error rate BER.

Figure 13:
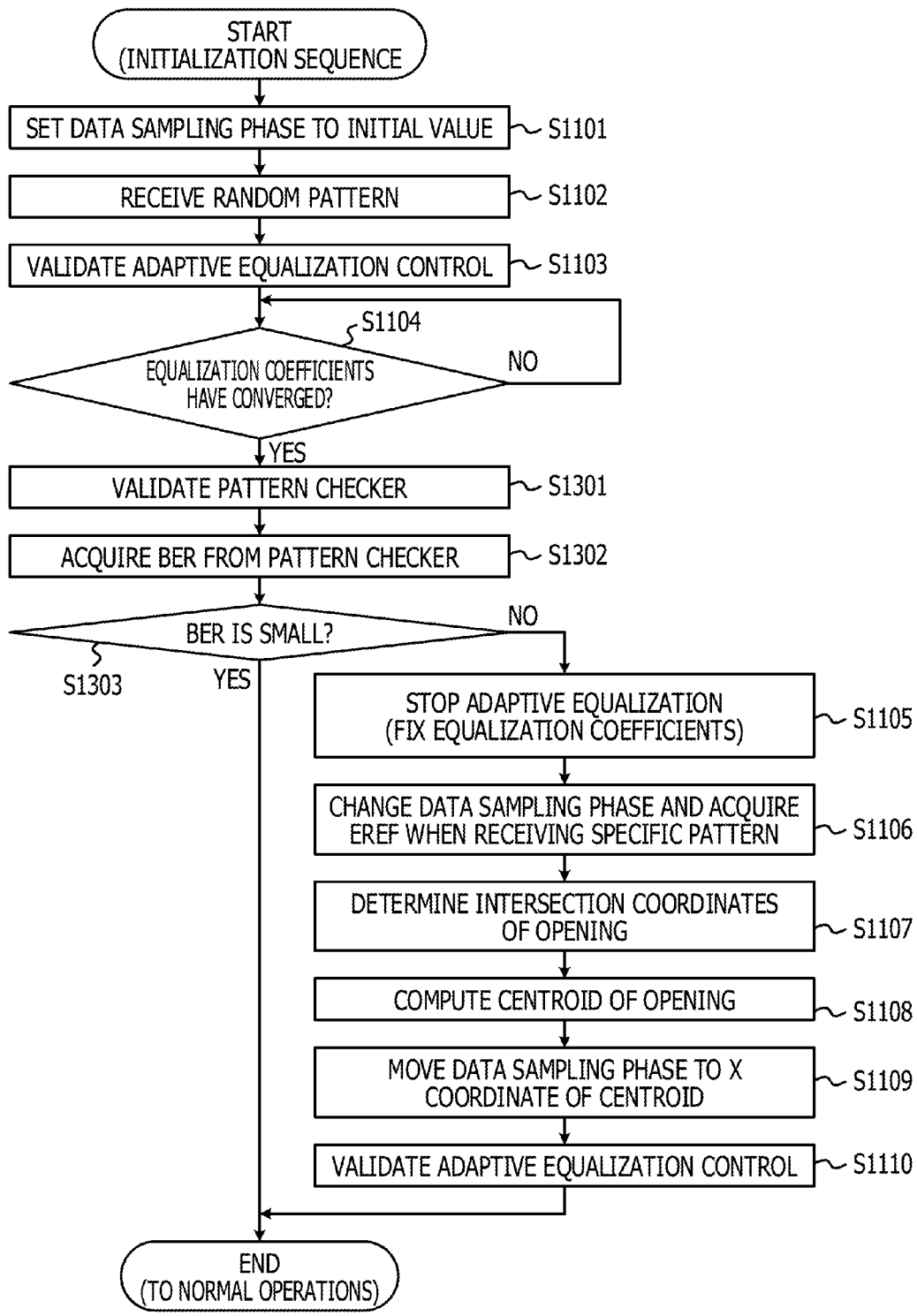
FIG. 13 illustrates an example of a method for controlling a receiving circuit.

FIG. 13 illustrates an example of a method for controlling a receiving circuit. The receiving circuit performs operations S1101 to S1104. Operations S1101 to S1104 may be substantially the same as operations S1101 to S1104 illustrated in FIG. 11. In operation S1102, the receiving circuit receives a pseudo-random pattern as the input data signal Di.

In operation S1301, the receiving circuit validates the pattern checker 1201. The pattern checker 1201 compares the center data Do with the expected value and computes the bit error rate BER. In operation S1302, the phase control circuit 114 acquires the bit error rate BER from the pattern checker 1201.

In operation S1303, the phase control circuit 114 checks whether or not the bit error rate BER is smaller than a threshold. If the bit error rate BER is smaller than the threshold, the phase control circuit 114 fixes the phase difference information Sh to a value corresponding to 0.5 UI, and the receiving circuit proceeds to normal operations. In this case, since the bit error rate BER is small, operations S1105 to S1110 may not be performed.

If the bit error rate BER is larger than the threshold, operations S1105 to S1110 are performed. Operations S1105 to S1110 may be substantially the same as operations S1105 to S1110 illustrated in FIG. 1. Then, as in the case illustrated in FIG. 1, the receiving circuit proceeds to normal operations. In this case, performing operations S1105 to S1110 may reduce the bit error rate BER.

The phase control circuit 114 outputs the phase difference information Sh of output data of the decision feedback equalizer 102 based on the centroid Gc of the opening of the eye pattern if the bit error rate BER is larger than the threshold, and outputs the phase difference information Sh corresponding to 0.5 UI if the bit error rate BER is smaller than the threshold.

Figure 14:
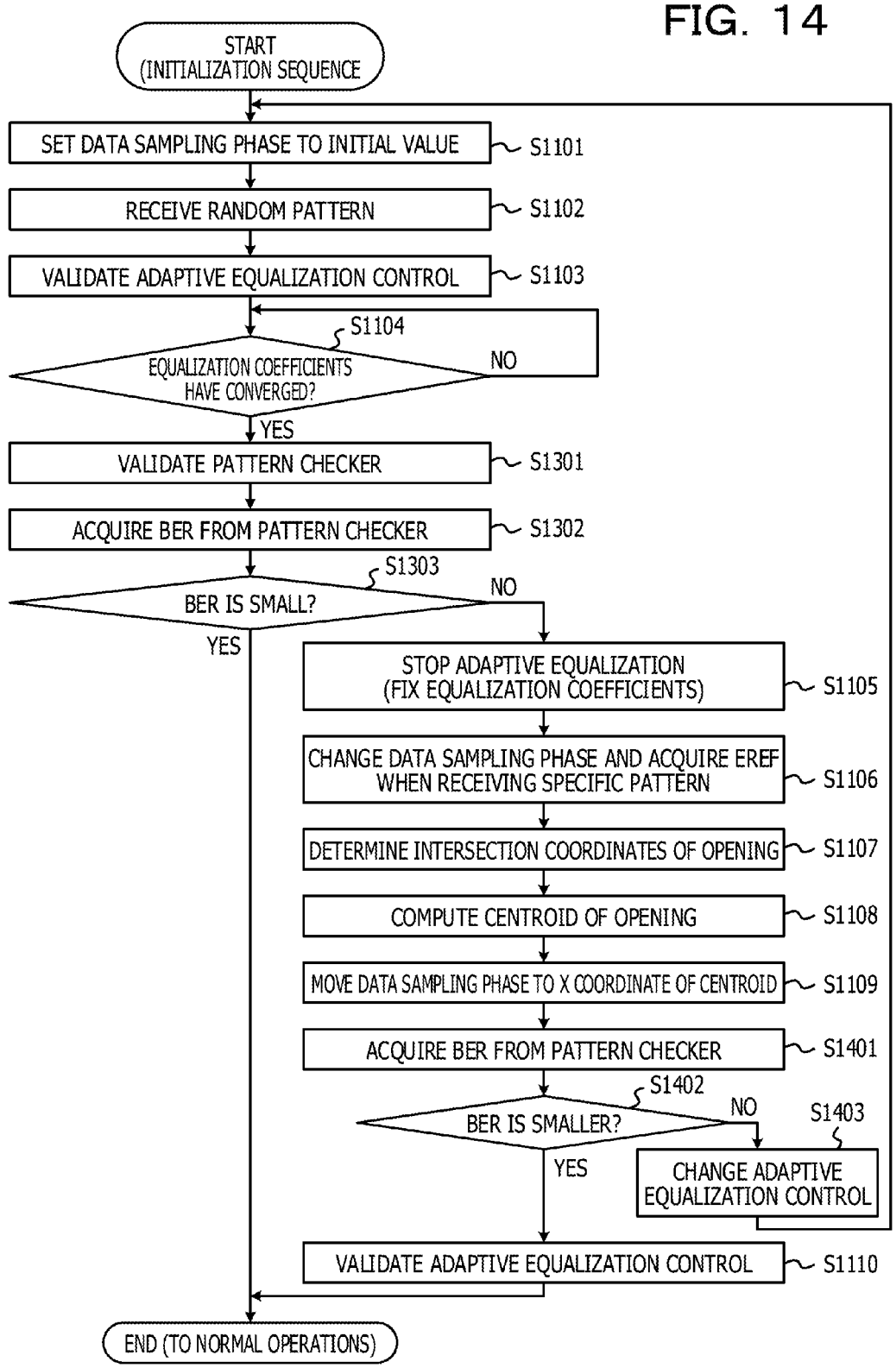
FIG. 14 illustrates an example of a method for controlling a receiving circuit.

FIG. 14 illustrates an example of a method for controlling a receiving circuit. A receiving circuit having a configuration substantially the same as or similar to the receiving circuit illustrated in FIG. 12 may perform the control method illustrated in FIG. 14. In the control method illustrated in FIG. 14, operations S1401 to S1403 are added to the control method illustrated in FIG. 13. Hereinafter, points at which the control method illustrated in FIG. 14 differs from the control method illustrated in FIG. 12 will be described, and redundant description of similar portions may be omitted or reduced.

The receiving circuit performs operation S1401 after performing operation S1109. In operation S1401, the phase control circuit 114 acquires the bit error rate BER from the pattern checker 1201.

In operation S1402, the phase control circuit 114 checks whether or not the bit error rate BER is smaller than the threshold. If the bit error rate BER is smaller than the threshold, the process proceeds to operation S1110. In operation S1110, as in FIG. 11, the receiving circuit validates adaptive equalization control of the equalization control circuit 112. Then, the receiving circuit performs normal operations. In this case, through operations S1105 to S1109, the bit error rate BER is decreased, and thus the receiving circuit proceeds to normal operations.

If the bit error rate BER is larger than the threshold, the process proceeds to operation S1403. In operation S1403, the equalization control circuit 112 changes a method for computing the equalization coefficient Cz and/or Cd. For example, the equalization control circuit 112 performs setting for the computation method in operation S1103 so that the equalization coefficient Cz and/or Cd is generated by using a different computation method. Then, the process returns to the initial operation S1101, where the phase control process is redone from the beginning. In operation S1110, as in the above description, the receiving circuit validates adaptive equalization control of the equalization control circuit 112. Then, the receiving circuit performs normal operations. In this case, since, in operations S1105 to S1109, the bit error rate BER is not decreased, the method for computing equalization coefficients is changed in operation S1403. Therefore, the bit error rate BER is reduced, and the receiving circuit proceeds to normal operations. For example, if the method for computing equalization coefficients of the equalization control circuit 112 used in operation S1103 is not appropriate, the area of the opening of the eye pattern may be decreased, and the bit error rate BER may become larger than the threshold. In this case, changing the method for computing equalization coefficients of the equalization control circuit 112 in operation S1403 may decrease the bit error rate BER.

Figure 15:
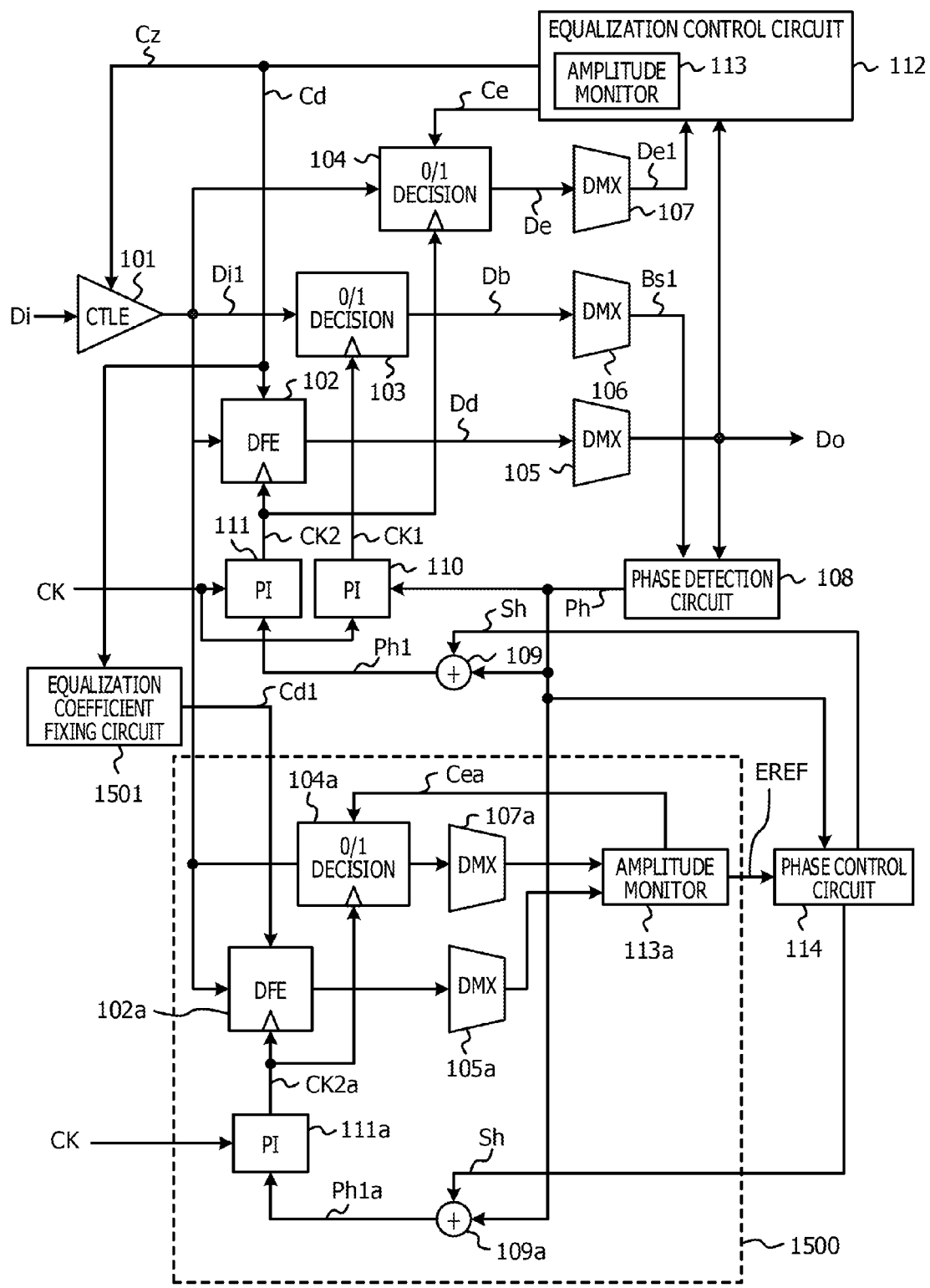
FIG. 15 illustrates an example of a receiving circuit.

FIG. 15 illustrates an example of a receiving circuit. In the receiving circuit illustrated in FIG. 15, a monitor circuit 1500 and an equalization coefficient fixing circuit 1501 are added to the receiving circuit illustrated in FIG. 1. Hereinafter, points at which the receiving circuit illustrated in FIG. 15 differs from the receiving circuit illustrated in FIG. 1 will be described, and redundant description of similar configurations may be omitted or reduced.

The equalization coefficient fixing circuit 1501, in compliance with an instruction, stores the equalization coefficient Cd at that point and outputs the stored equalization coefficient Cd as a fixed equalization coefficient Cd1. Then, the equalization coefficient fixing circuit 1501 outputs the fixed equalization coefficient Cd1.

The monitor circuit 1500 includes a decision feedback equalizer 102a, a decision circuit 104a, demultiplexing circuits 105a and 107a, an adder 109a, a phase adjustment circuit 111a, and an amplitude monitor 113a. In the receiving circuit illustrated in FIG. 15, a circuit portion similar to that illustrated in FIG. 1 may be a circuit to be monitored. The monitor circuit 1500 is a circuit for monitoring the circuit to be monitored.

The decision feedback equalizer 102a, which has a configuration similar to that of the decision feedback equalizer 102 illustrated in FIG. 1, outputs data obtained by performing equalization and a binary decision on the input data signal Di1 using the equalization coefficient Cd1, as center data, in synchronization with a clock signal CK2a. The decision circuit 104a, which has a configuration similar to the decision circuit 104 illustrated in FIG. 1, outputs data obtained by performing a binary decision on the input data signal Di1 using a threshold Cea in synchronization with the clock signal CK2a.

The demultiplexing circuit 105a, which has a configuration similar to that of the demultiplexing circuit 105 illustrated in FIG. 1, demultiplexes output data of the decision feedback equalizer 102a and outputs the center data. The demultiplexing circuit 107a, which has a configuration similar to that of the demultiplexing circuit 107 illustrated in FIG. 1, demultiplexes output data of the decision circuit 104a and outputs amplitude data.

The amplitude monitor 113a, corresponding to the amplitude monitor 113, receives output data of the demultiplexing circuits 105a and 107a, outputs the threshold Cea to the decision circuit 104a, and outputs the amplitude value EREF to the phase control circuit 114. The phase control circuit 114, as in FIG. 1, receives the amplitude EREF and the phase information Ph and outputs the phase difference information Sh to the adders 109 and 109a.

The adder 109a, similarly to the adder 109 illustrated in FIG. 1, adds the phase information Ph and the phase difference information Sh and outputs phase information Ph1a to the phase adjustment circuit 111a. The phase adjustment circuit 111a, similarly to the phase adjustment circuit 111, adjusts the clock signal CK2a in accordance with the phase information Ph1a.

FIG. 16 illustrates an example of a method for controlling a receiving circuit. Operations S1601 to S1603 are processing of an initialization sequence, and operations S1604 to S1611 are processing of normal operations.

In operation S1601, as in operation S1101 illustrated in FIG. 11, the phase adjustment circuit 111 outputs the second clock signal CK2 in accordance with the phase information Ph1 of the initial value. The phase adjustment circuit 111a outputs the clock signal CK2a in accordance with the phase information Ph1a of the initial value. For example, the phase difference information Sh of the initial value may be a value corresponding to 0.5 UI.

In operation S1602, the receiving circuit receives data as the input data signal Di from the transmission circuit. In operation S1603, the receiving circuit validates adaptive equalization control of the equalization control circuit 112. In operation S1604, the receiving circuit waits until the equalization coefficients Cz and Cd have converged, and, if the equalization coefficients Cz and Cd have converged, the process proceeds to operation S1605.

In operation S1605, the equalization coefficient fixing circuit 1501 stores the equalization coefficient Cd and outputs the stored equalization coefficient Cd as the fixed equalization coefficient Cd1. In operation S1606, the phase adjustment circuit 111a changes the phase of the clock signal CK2a at a slower rate than the bit rate of the input data signal Di, for example, within a range of 1 UI. At that point, the phase control circuit 114 acquires the amplitude value EREF of a specific pattern from the amplitude monitor 113a.

In operation S1607, as in operation S1107 illustrated in FIG. 11, the phase control circuit 114 determines coordinates of the intersections 701 to 704 (FIG. 7) of the opening of the eye pattern. In operation S1608, as in operation S1108 illustrated in FIG. 11, the phase control circuit 114 computes the centroid Gc (FIG. 10) of the opening of the eye pattern. In operation S1609, as in operation S1109 illustrated in FIG. 11, the phase control circuit 114 outputs the phase difference of the centroid Gc as the phase difference information Sh. The adders 109 and 109a each add the phase information Ph and the phase difference information Sh and respectively output the phase information Ph1 and the phase information Ph1a. The phase adjustment circuit 111 controls the phase of the second clock signal CK2 in accordance with the phase information Ph1. The phase adjustment circuit 111a controls the phase of the clock signal CK2a in accordance with the phase information Ph1a. Therefore, each of the phases of rising edges of the clock signals CK2 and CK2a is the phase of the centroid Gc. The decision feedback equalizers 102 and 102a perform binary decisions in synchronization with rising edges of the clock signals CK2 and CK2a, respectively, and thus each output the center data 711 (FIG. 7) at the phase of the centroid Gc. Therefore, the decision error rate may be reduced.

In operation S1610, the receiving circuit determines whether or not to finish automatic adjustment processing in operations S1604 to S1609. For example, when the operations of the monitor circuit 1500 are stopped in order to reduce power consumption, the process proceeds to operation S1611 so as to finish the automatic adjustment processing. In the case of continuing the automatic adjustment processing, the process returns to operation S1604.

In operation S1611, the receiving circuit powers off the monitor circuit 1500 and thus stops the operations of the monitor circuit 1500. Therefore, power consumption may be reduced. Thereafter, the receiving circuit (the circuit to be monitored) other than the monitor circuit 1500 continues to operate. For example, the receiving circuit may continue normal operations for reproducing the center data Do.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving circuit comprising:
   a first decision circuit configured to output, as boundary data, data obtained by performing a binary decision on an input data signal in synchronization with a first clock signal;
   a first decision feedback equalizer configured to output, as center data, data obtained by performing equalization and a binary decision on the input data signal using a first equalization coefficient in synchronization with a second clock signal;
   a phase detection circuit configured to detect phase information of the input data signal based on the boundary data and the center data;
   an equalization control circuit configured to receive a request signal and output an amplitude value of a data transition pattern of the input data signal in response to the request signal;
   a phase control circuit configured to output the request signal to the equalization control circuit, receive the amplitude value from the equalization control circuit and the phase information from the phase detection circuit and output phase difference information of the center data based on the amplitude value and the phase information;
   a first phase adjustment circuit configured to adjust a phase of the first clock signal in accordance with the phase information; and
   a second phase adjustment circuit configured to adjust a phase of the second clock signal in accordance with the phase information and the phase difference information.

2. The receiving circuit according to claim 1, wherein the phase control circuit is configured to compute a centroid of an opening of an eye pattern and output the phase difference information in accordance with the centroid of the opening of the eye pattern.

3. The receiving circuit according to claim 1, wherein the phase control circuit is configured to detect four, upper, lower, left, and right intersections of an opening of an eye pattern, compute a centroid of a quadrilateral with the four intersections, and output the phase difference information in accordance with the centroid of the quadrilateral.

4. The receiving circuit according to claim 1, further comprising:
   a pattern checker configured to output a bit error rate by comparing output data of the first decision feedback equalizer with an expected value,
   wherein the phase control circuit is configured to output the phase difference information based on the bit error rate.

5. The receiving circuit according to claim 4, wherein the phase control circuit is configured to output, as the phase difference information, first phase difference information corresponding to output data of the first decision feedback equalizer if the bit error rate is larger than a first threshold, and outputs second phase difference information corresponding to a given unit interval if the bit error rate is smaller than the first threshold.

6. The receiving circuit according to claim 5, wherein the given unit interval is a 0.5 unit interval.

7. The receiving circuit according to claim 5, wherein the:
   equalization control circuit is configured to compute the first equalization coefficient, using output data of the first decision feedback equalizer,
   wherein, after the phase control circuit outputs the first phase difference information, the equalization control circuit changes a method for computing the first equalization coefficient if the bit error rate is larger than a second threshold.

8. The receiving circuit according to claim 1, further comprising:
   a second decision feedback equalizer configured to output, as the center data, data obtained by performing equalization and a binary decision on the input data signal using a second equalization coefficient in synchronization with a third clock signal; and
   a third phase adjustment circuit configured to adjust a phase of the third clock signal in accordance with the phase information and the phase difference information,
   wherein the phase control circuit is configured to output the phase difference information in accordance with output data of the second decision feedback equalizer.

9. The receiving circuit according to claim 1, further comprising:
   a second decision circuit configured to, in synchronization with the second clock signal, perform a binary decision on the input data signal using a third threshold,
   wherein the phase control circuit is configured to output the phase difference information in accordance with a decision result of the second decision circuit.

10. The receiving circuit according to claim 1, further comprising:
an equalizer configured to equalize the input data signal,
wherein the first decision circuit and the first decision feedback equalizer receive the input data signal equalized by the equalizer.

11. The receiving circuit according to claim 1, further comprising:
a first demultiplexing circuit configured to demultiplex output data of the first decision circuit; and
a second demultiplexing circuit configured to demultiplex output data of the first decision feedback equalizer,
wherein the phase detection circuit is configured to detect phase information of the input data signal, using the output data of the first demultiplexing circuit and the output data of the second demultiplexing circuit.

12. The receiving circuit according to claim 1, wherein the phase control circuit generates the phase difference information of the center data based on an opening of an eye pattern that is formed by overlaying a plurality of data transition patterns of the input data signal on a time base.

13. A data decision method comprising:
outputting, as boundary data, data obtained by performing a binary decision on an input data signal in synchronization with a first clock signal;
outputting, as center data, data obtained by performing equalization and a binary decision on the input data signal using a first equalization coefficient in synchronization with a second clock signal in a first decision feedback equalizer;
detecting phase information of the input data signal based on the boundary data and the center data;
outputting a request signal from a phase control circuit to an equalization control circuit;
outputting an amplitude value of a data transition pattern of the input data signal from the equalization control circuit to the phase control circuit in response to the request signal;
outputting phase difference information of the center data based on the amplitude value and the phase information;
adjusting a phase of the first clock signal in accordance with the phase information; and
adjusting a phase of the second clock signal in accordance with the phase information and the phase difference information.

14. The data decision method according to claim 13, further comprising:
computing a centroid of an opening of the eye pattern; and
outputting the phase difference information in accordance with the centroid of the opening of the eye pattern.

15. The data decision method according to claim 13, further comprising:
detecting four, upper, lower, left, and right intersections of an opening of an eye pattern;
computing a centroid of a quadrilateral with the four intersections; and
outputting the phase difference information in accordance with the centroid of the quadrilateral.

16. The data decision method according to claim 13, further comprising:
acquiring a bit error rate by comparing output data of the first decision feedback equalizer with an expected value,
wherein the phase difference information is acquired based on the bit error rate.

17. The data decision method according to claim 16, wherein first phase difference information corresponding to output data of the first decision feedback equalizer is output as the phase difference information if the bit error rate is larger than a first threshold, and second phase difference information corresponding to a given unit interval is output as the phase difference information if the bit error rate is smaller than the first threshold.

18. The data decision method according to claim 17, wherein the given unit interval is a 0.5 unit interval.

19. The data decision method according to claim 17, further comprising:
computing the first equalization coefficient using the output data of the first decision feedback equalizer;
changing, after outputting the first phase difference information, a method for computing the first equalization coefficient if the bit error rate is larger than a second threshold.

20. The data decision method according to claim 13, further comprising:
generating the phase difference information of the center data based on an opening of an eye pattern that is formed by overlaying a plurality of data transition patterns of the input data signal on a time base.

* * * * *